Figure 1:
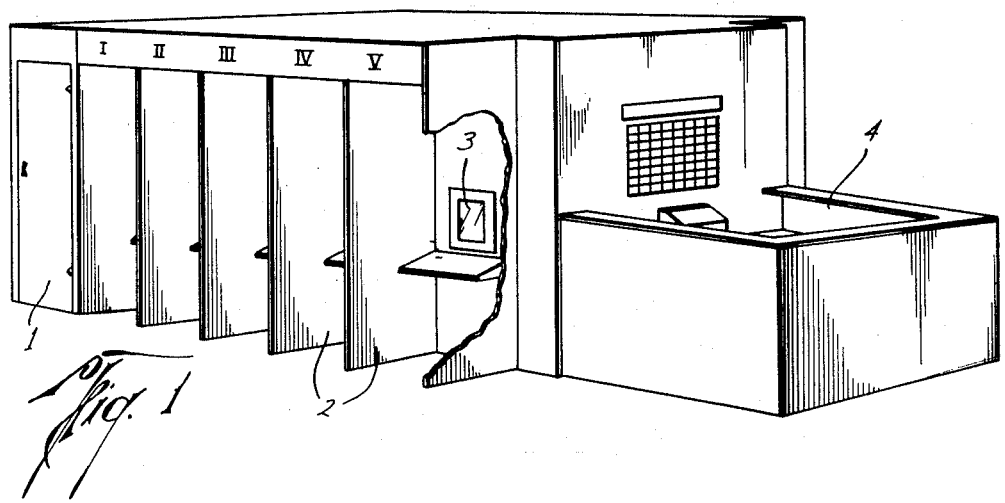

Jan. 5, 1965 R. E. TURRENTINE, JR 3,164,059
MICROFILM SELECTOR

Filed Dec. 27, 1960 6 Sheets-Sheet 1

R. E. Turrentine, Jr.
INVENTOR.

BY

ATTORNEY

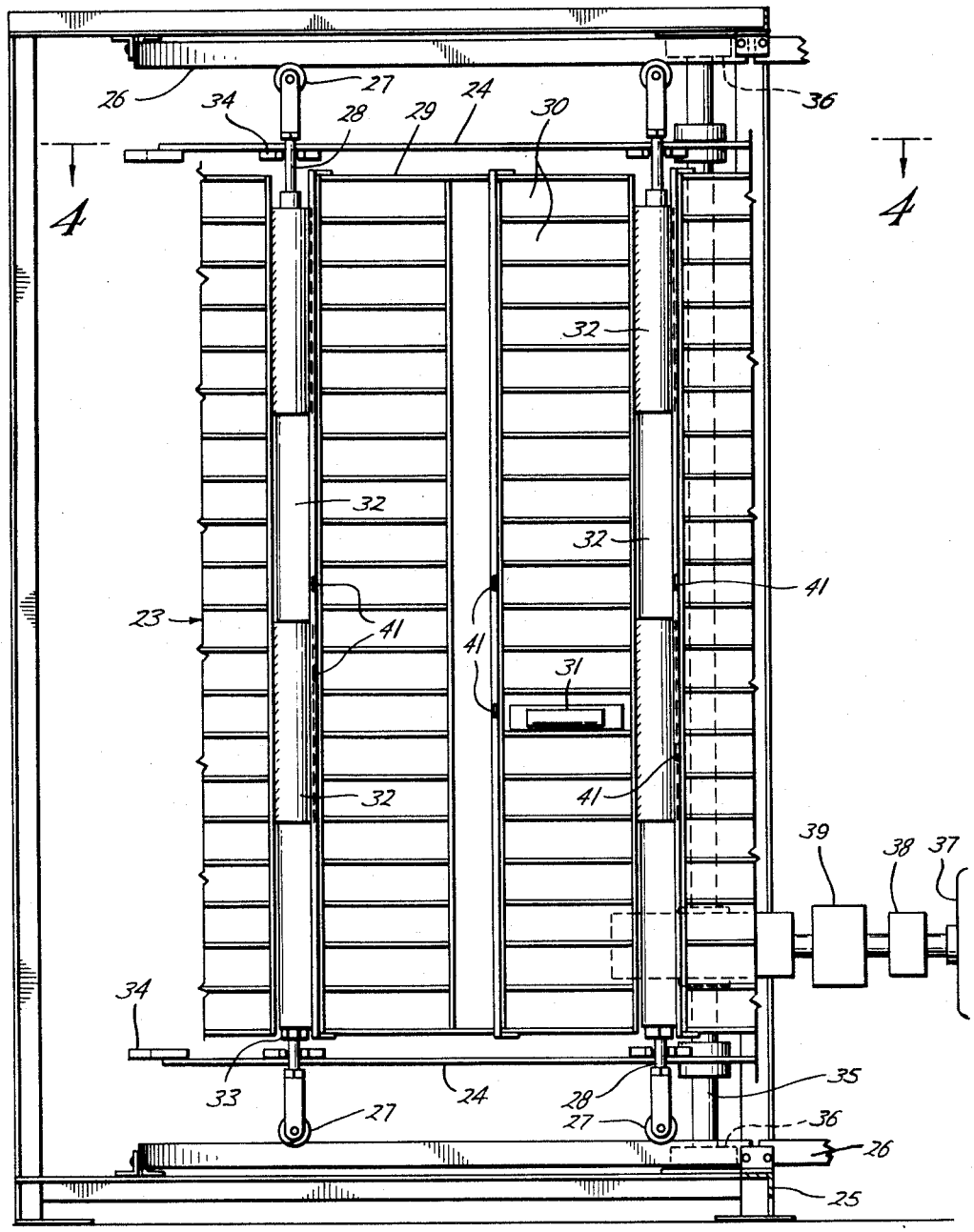

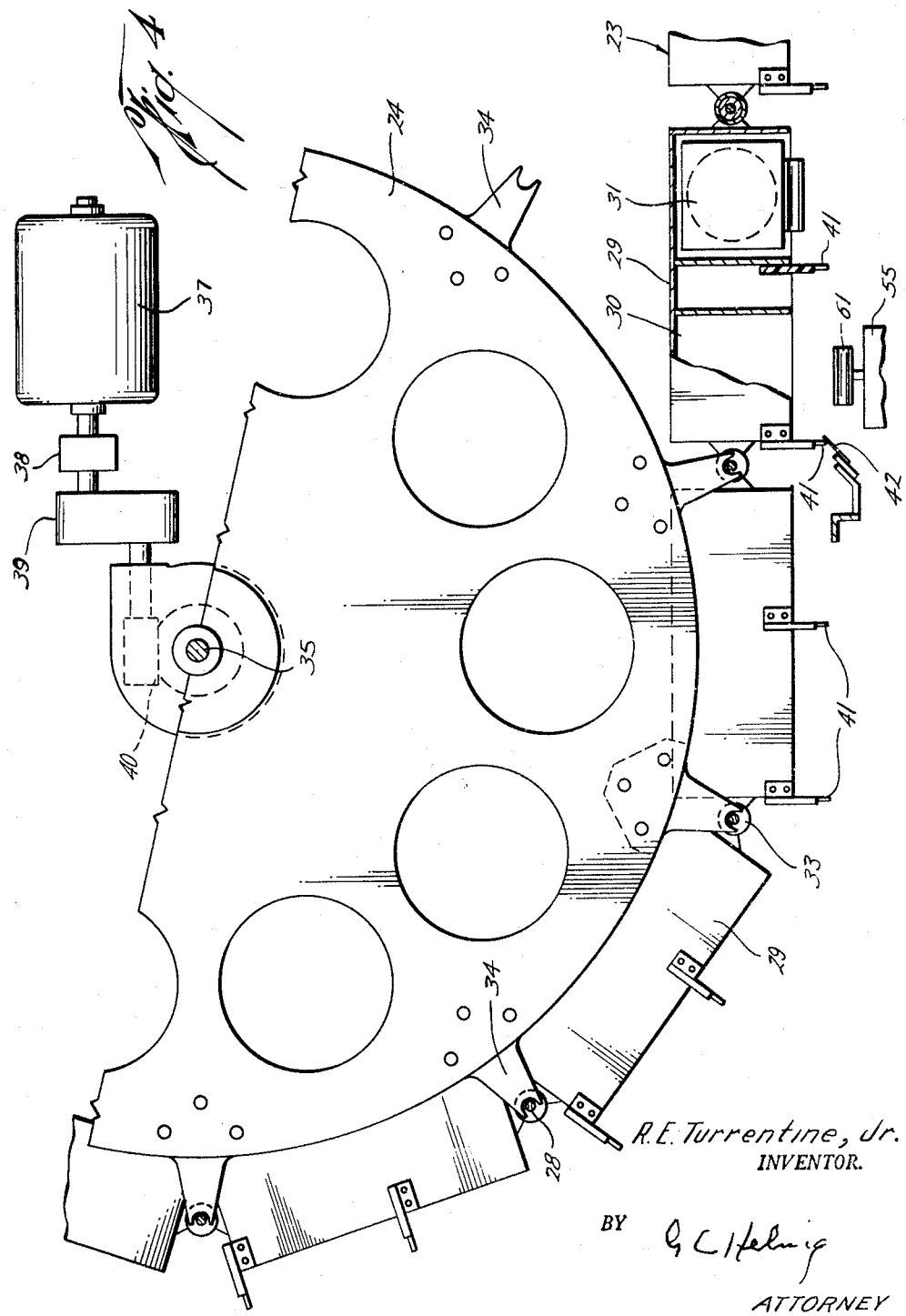

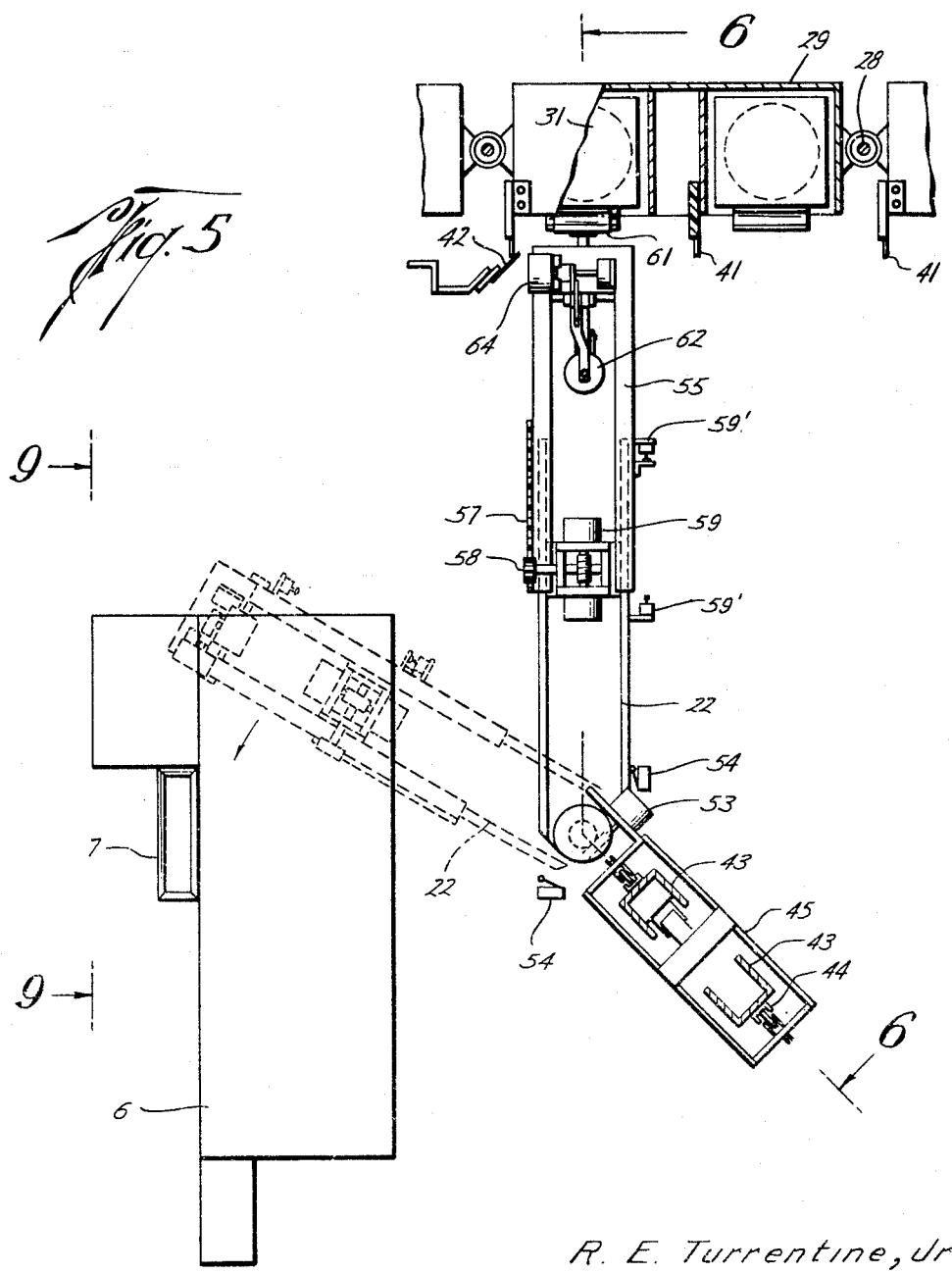

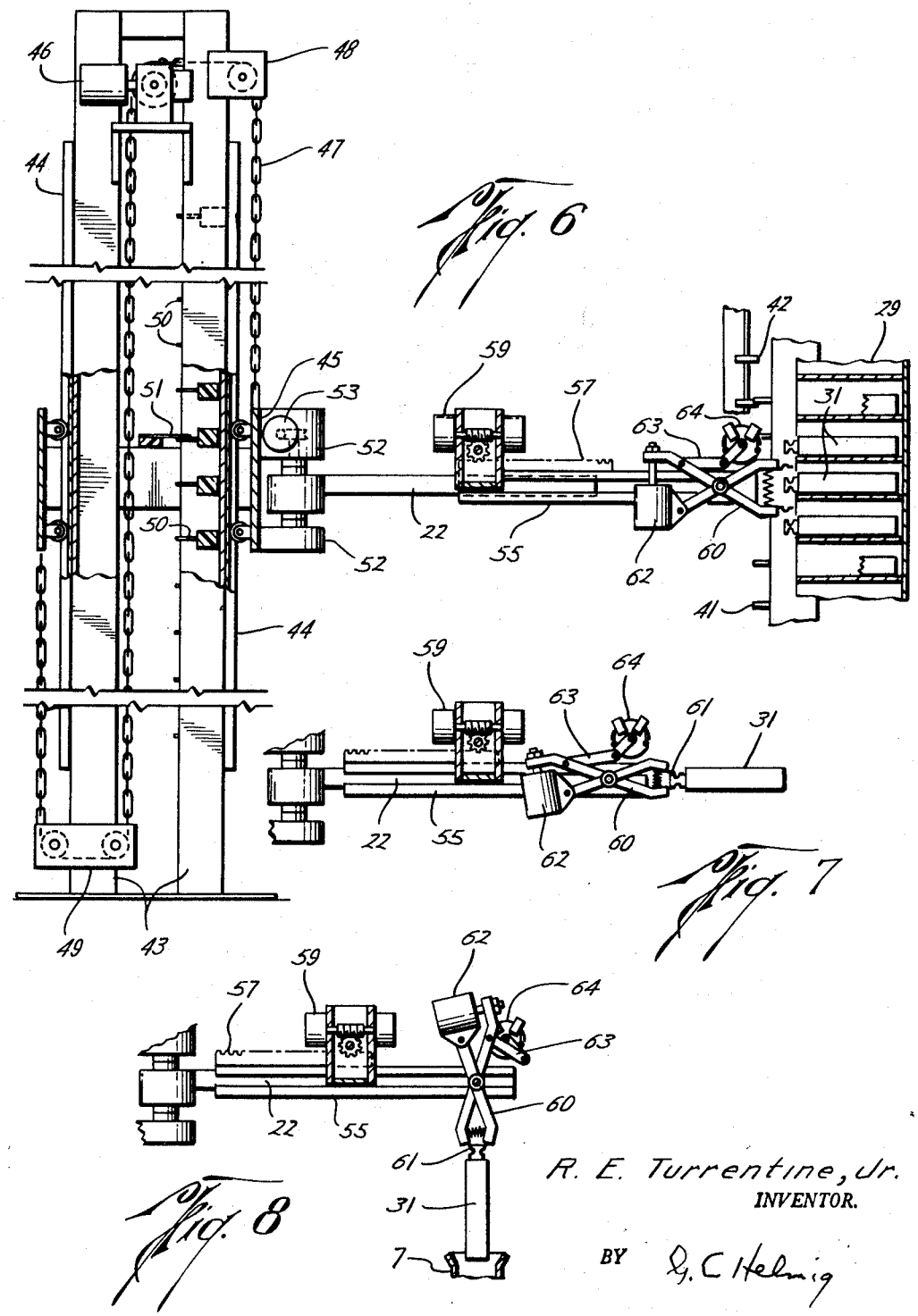

Jan. 5, 1965  R. E. TURRENTINE, JR  3,164,059
MICROFILM SELECTOR
Filed Dec. 27, 1960  6 Sheets-Sheet 6
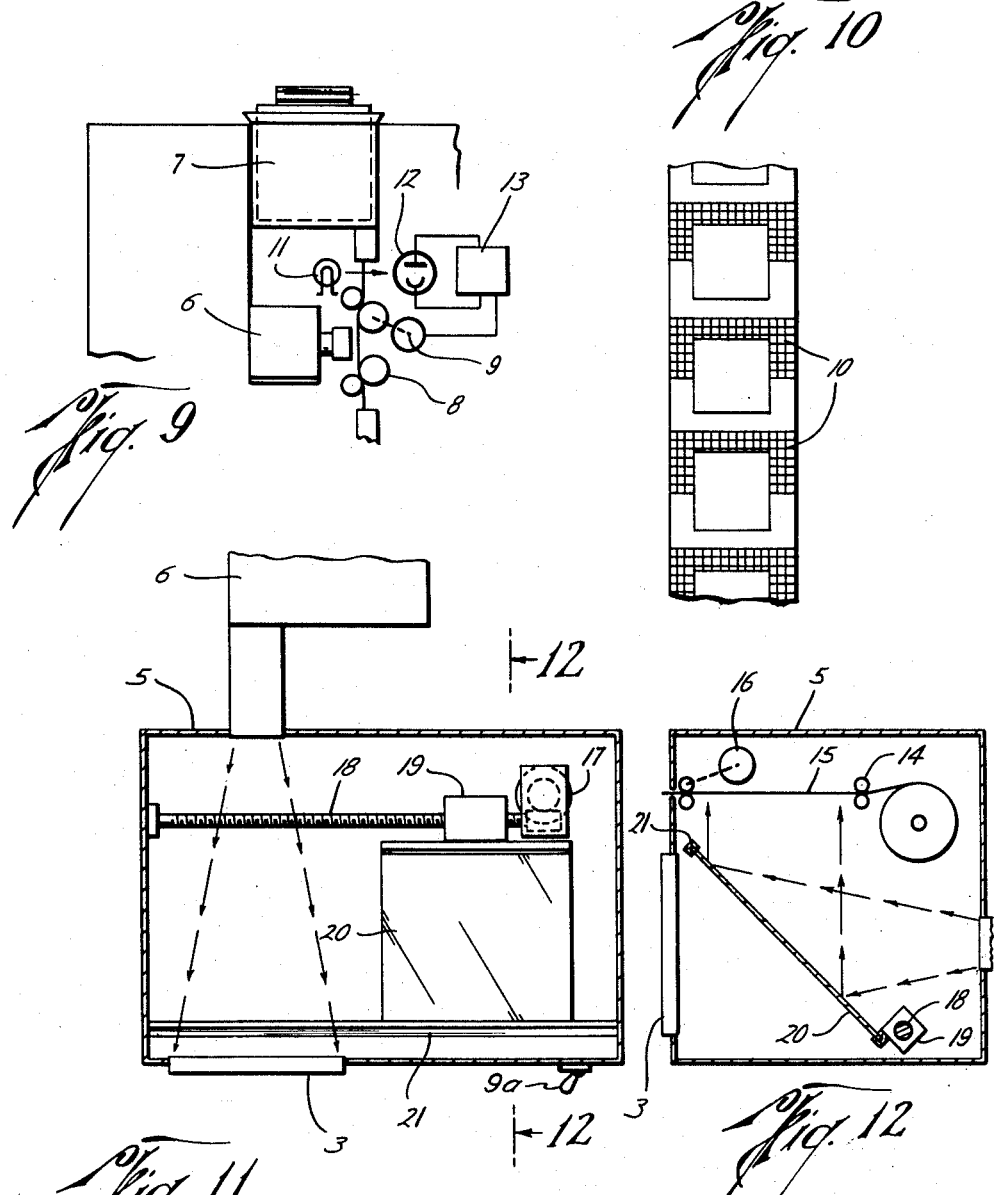
R. E. Turrentine, Jr.
INVENTOR.
BY *J. C. Helmig*
ATTORNEY

United States Patent Office 3,164,059
Patented Jan. 5, 1965

3,164,059
MICROFILM SELECTOR
Robert E. Turrentine, Jr., 4542 Bellaire Blvd.,
Bellaire, Tex.
Filed Dec. 27, 1960, Ser. No. 78,638
14 Claims. (Cl. 88—23)

This invention relates to a machine for bringing into view any selected one of a collection of records and more particularly to an improved mechanical handling apparatus for storing rolls of microfilm consisting of long strips or tapes and containing data recorded on successive pictures or frames, and for controlled utilization of power to remove from storage a desired roll, place it in a projector, index the projector to a selected picture or frame for examination and thereafter rewind the roll and return it to original storage position, all with minimum expenditure of time and effort and without manual handling of the rolls of films.

An object of the invention is to provide mechanism to enable immediate production and reproduction, if desired, of any known record of many on file. The subject matter is of especial utility for handling enormous quantities of written items which need to be preserved for ready and frequent reference. By way of example, the improved machine will enable simplification of examination and study of property title instruments registered with local government offices. Such recordings are indexed for availability of inspection but if in the form of full-size copies, they occupy much valuable space, require considerable time and manpower to take from storage shelves and replace and are subject to damage, misplacement and loss. To conserve space and for other reasons, a growing practice is to photographically record writings in reduced size and on rolls of microfilm, which can be stored compactly on reels indexed as to roll and frame. Heretofore, inspection of a recording on microfilm has been by manual location and removal from storage of the numbered roll and the placement thereof in a light projector through which the roll is run until a pertinent frame comes into view. Following inspection, the microfilm is rewound and removed by an attendant for return to its assigned storage shelf. It is the human element in such procedure which is eliminated by the mechanism here involved.

A further object of the invention is to provide a self contained assembly of film storage racks and one or more viewing stations, each containing a viewer, together with power drive means regulated from a central control panel to pick a selected roll of recordings from storage and transfer the same to a station viewer and in a later operation to unload the viewer and return the roll to roll storage position.

Another object of the invention is to provide a rapid finder whose operating components in sequence shift a conveyor rack of multiple rows of storage cells to present a given row at a selected viewing station and then actuate a clamping device to select a desired film magazine which contains the selected roll of film from its storage cell and transfer it to the viewer for frame examination for any required time interval, during which period of examination the conveyor rack is available to similarly serve other stations and can be positioned and repositioned for transfer of other films back and forth between storage cells and viewers and with the restoration of each magazine to its given storage location.

A still further object of the invention is to provide a finder wherein a viewing projector incorporates an adjustable index code counter which can be preset to stop the unwinding action at a frame to be examined and additionally incorporates a copy printer for reproducing the enlarged image which is projected onto the viewing screen.

Figure 2:
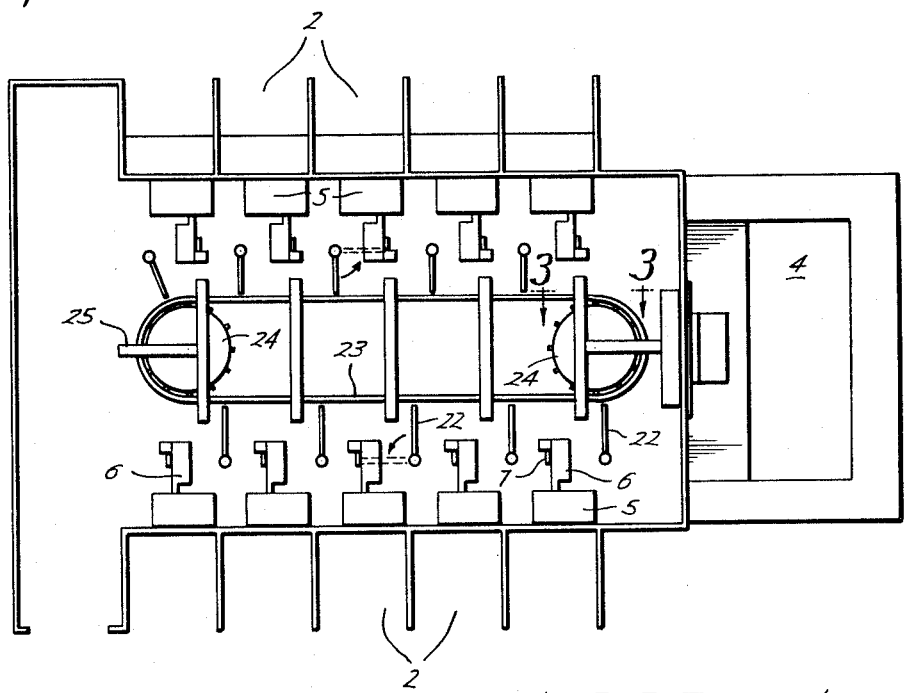

Other objects and advantages will become apparent from the following specification having reference to the accompanying drawings wherein FIG. 1 shows in perspective the exterior appearance of a storage file and viewer installation; FIG. 2 is a top plan view of the installation of FIG. 1 but omitting the upper covering wall; FIG. 3 is an enlarged side elevation of a fragment of the storage rack as viewed substantially on line 3—3 of FIG. 2; FIG. 4 is a top plan view of parts of the traveling rack at one end loop with some structure shown in section and is taken as on line 4—4 of FIG. 3; FIG. 5 is a top plan view of a magazine selector and transfer mechanism in co-operative relationship with a storage cell and the receiver of a projector at a viewing station; FIG. 6 is a part side elevation and part section generally on line 6—6 of FIG. 5 and showing the transfer mechanism in alignment with one of the storage cells with the magazine holding clamp in open jaw position; FIGS. 7 and 8 are elevations of parts of the transfer mechanism and respectively show clamping jaws contracted and supporting a magazine just outside a storage compartment and show the clamping jaws and a supported magazine rotated to a position downwardly projected in alignment with a receiver mouth at a viewing station; FIG. 9 shows the receiver and a projector therebelow in elevation with a film in viewing position together with frame counter equipment as viewed on line 9—9 of FIG. 5; FIG. 10 is an elevation of a fragment of the film tape; FIG. 11 is a horizontal transverse section at the projector viewing screen and illustrates parts of the copy printer in non-printing relation and outside the path of image projection on the viewing screen and FIG. 12 shows the copy printer in vertical section and with the parts in copy printing relation.

Referring to the drawings, the exterior appearance of a large cabinet or walled enclosure for the operating mechanisms is shown in FIG. 1 where there are seen an access door 1, a series of side by side booths 2, each having in its forward wall a viewing screen 3 and an attendant's or master station 4, at which are located various primary operating controls for the mechanism.

Associated with each viewing screen 3 is a copy printer housing 5 across which is to be projected to the screen an image from a projector 6 having a magazine receiver 7. A microfilm viewer known as Recordak Lode Star Reader embodies mechanism to respond automatically upon insertion of a film magazine to advance the film, and as seen in FIG. 9, operates when a film magazine is placed within the receiver 7, to unreel the microfilm roll by causing it to run between sets of guide rollers 8 across the path of light directed by the projector 6 onto the viewing screen 3. One or more of the feed rolls is driven by an electric motor 9 and the motor circuit contains a manually operated switch by which advance, return and holding of the film roll are controlled.

It is here proposed to additionally control feed motor operation to stop the roll automatically after a selected number of frames have been brought into view and counted. For co-operation with a counter, the roll is provided with alternate transparent and opaque regions of substantially uniform or equal length and, as shown in FIG. 10, an opaque area 10 occurs on both sides of and adjacent each frame, so that when the tape travels between a light source 11 and an electric eye or light sensitive cell 12, the light will be blanked off from the cell 12 intermittently in accordance with the number of passing frames. The electric eye is connected to and its responses control an adjustable counter device 13 which can be preset to act after passage of any selected number of frames, for actuating a cut-off switch in the feed motor circuit. Thus, when recorded information is to be examined and its frame number is known, the adjustable counter can be set accordingly to stop film travel upon alignment of the numbered frame with the projector beam and present the desired image on the viewing screen.

As a supplement to the motor circuit control switch located at the attendant's station 4 for effecting relatively fast film unwind or rewind travel to or from given frame presentation at the screen 3, there is indicated in FIG. 11 a secondary motor control switch 9ª operable by the person examining the frame image to effect slow speed motor operation in either direction should it be desired to bring an adjacent frame into view. Such need will occur, for example, when succeeding frames contain different portions of a record under examination. Conveniently, the indexing switch 9ª has a pivoted lever to be swung from a central off position and in either of opposite directions between motor forward drive position and reverse position whereby motor drive shifts the frame and brings to the viewing screen 3 a desired succeeding or preceding frame.

Should a copy of any record be wanted, the reproducing camera illustrated in FIGS. 11 and 12 can be operated. This camera unit may embody any conventional photoprintting system and neither it nor the processing of the print are critical to the present invention. Hence FIG. 12 simplifies the disclosure by merely illustrating a photocopy strip exposed to a projected image. As shown, the unit includes the copy printer housing 5 having supporting rolls 14 for locating a supply of light sensitive strip 15 to one side and out of the path of projected light across the box 5 to the viewing screen 3. Conveniently, one of the feed rolls 14 may be drive connected to an electric motor, indicated at 16. Another electric motor 17 is geared to rotate a screw shaft 18 mounted in support bearings to extend transversely of the projected light path and of a length double or more the width of the light path. A traveling nut 19 on the rotatable shaft 18 is fixedly secured to the lower edge of a mirror or reflector plate 20 which extends in an upwardly inclined plane from the nut and has its opposite end slidably guided in a support rail 21.

Normally, this mirror 20 is located, as shown in FIG. 11, beyond one side of and laterally offset from both the copy strip 15 and the projected light path so that the projected image goes to the viewing screen 3 without impingement on the copy strip. Rotation of the drive screw 18 will shift the mirror 20 to and from an operative position in which the reflecting surface is aligned with or aimed at the copy strip 15 and extends across the light path to receive a projected image and reflect the same onto a portion of the light sensitive film 15. Thus, when a particular microfilm frame is located in reading position and its reproduction is desired, the light projector is momentarily cut off and the motor 17 is operated to shift the mirror 20 from its inactive FIG. 11 position and into its image reflecting position, as seen in FIG. 12, whereupon the projector light is again switched on for a necessary printing interval, after which the light is blanked off and the screw drive motor 17 is reversed to restore the mirror to inactive position and the feed roll motor 16 is operated for advancing the printed sheet section out of the box 5.

For storing a large number of film rolls each containing a large number of frames and for viewing any frame selectively at any of several viewing stations, there is provided at each station a magazine transfer mechanism for co-operation with a traveling magazine storage rack in the general arrangement illustrated in FIG. 2. At each station there is located a transfer arm 22 pivotally mounted for oscillation through an angular path between opposite limits horizontally spaced apart, one of which presents a free end of the arm adjacent the storage rack, as indicated by full line position of the several arms 22, and the other of which presents the free end of the arm in vertical superposed alignment with the receiver 7 of its associated projector 6, as indicated by dotted line positions of two of such arms. At the free end of the transfer arm, a magazine engaging and disengaging support is arranged to co-operate in picking up and depositing film amagazines at both the projector receiver and the storage pockets or cells of the rack. These calls are arranged as a longitudinal succession of rows or vertical tiers in an endless loop circuit array and the looped conveyor is indicated generally at 23 in FIG. 2. In addition to the oscillatory transfer action of the arm 22, it also is suspended for vertical travel to align its free end selectively with any cell in a vertical row, as will later be described in detail.

For positioning any vertical row of cells at any station, the endless conveyor rack is entrained at opposite loop ends on sprocket wheels 24—24, at least one of which is motor driven, and the two parallel conveyor reaches between the end loop sprocket wheels travel in paths to traverse all of the several viewing stations. By proper control of the drive motor, any longitudinally successive vertical row of magazine storing cells can be brought into aligned co-operation with the transfer lever arm 22 of any station for removal and return of a film magazine to any storage cell in that row.

The conveyor storage rack 23 in structural detail is shown in FIGS. 3 and 4 and includes a supporting main frame 25 structural steel elements including top and bottom stringers spaced apart by vertical supporting posts whose feet are anchored to a fixed foundation. Located by the top and bottom framing elements are upper and lower rails 26 providing vertically aligned endless trackways defining the travel path circuit of the movable rack. Riding on the trackways 26 are guide rollers 27 at opposite ends of a series of longitudinally spaced apart and vertically extending rack section connecting rods 28. Between adjacent pairs of the rods 28 are located sectional racks 29 partitioned by vertically spaced apart horizontal shelves or walls into vertical rows of magazine receiving pockets 30. Each pocket or cell 30 is for storage reception of a magazine or box 31 protectively enclosing a roll of microfilm.

Conveniently, each rack section 29 contains two side by side vertical rows of cells and has bracketed or welded along each of its leading and trailing sides, a group of apertured mounting projections preferably in the form of vertically spaced apart tubular sleeves 32 to embrace and hingedly receive the vertical rods 28. As seen in FIG. 3, there are two such vertically disposed sleeves at each side of each rack section 29 and those at one side are staggered or horizontally offset to those at the other side, so that each set of spaced apart sleeves has a nested interfitting relation to the hinged mounting sleeves of the next succeeding storage rack section. Below the lowermost hinged sleeve 32, a stop collar 33 is carried by each pin 28 for a rack load supporting relationship. The hinged interconnection of the rack sections accommodates travel of the conveyor in a curved path around the oppositely disposed sprocket wheels 24, of which there are a pair of upper and lower sprockets at each. Each sprocket wheel 24 has projecting outwardly from the periphery thereof a series of toothed or bifurcated brackets 34 circularly spaced apart for guide engagement with longitudinally succeeding hinge rods 28 above and below the rack sections.

The sprocket wheels of each pair of sprockets have their hubs fixedly secured to a vertical shaft 35 whose opposite ends are journaled in bearings 36 located by the top and bottom elements of the main frame 26. An electric motor 37 transmits drive to one set of the sprocket wheels through a clutch and brake unit 38 and a variable-speed gear box 39 to drive a worm 40 shown in dotted outline in mesh with a worm wheel fixed to the vertical shaft 35. It is proposed to employ a magnetic clutch and brake unit and an electric motor controlled variable pulley and belt assembly for the transmission of drive from an electric motor which in normal use is in constant operation. This will allow conveyor travel to be started and stopped through the operation of the magnetic clutch and brake unit 38 and will also enable the rate of travel to be decreased through control of the variable speed unit 39, immediately in advance of complete cessation of travel.

Conveyor travel to present any row of storage cells at any selected viewing station will be effected by proper control of electric circuits for actuation of the clutch and brake unit 38 and the variable-speed gear box 39. Such circuits will contain relay actuated switches whose action is responsive to make and break contactors arranged in sets of which selected sets can be set up at the attendant's station 4 for signaling the positioning of any vertical row of cells at any selected station. The arrangement involves the use of sets of co-operating circuit making blade contacts carried partly by the traveling conveyor and partly by each viewing station. Those contacts on the movable conveyor, as seen at 41 in FIG. 3, are arranged in sets to project outwardly from the leading side of each vertical row of cells. The contact blades 41 of each cell associated set are vertically spaced apart differently from the contacts 41 of all other cell associated sets, as indicated generally in FIG. 3. Any one of such sets can co-operate with correspondingly spaced apart contacts 42 of a group (see FIG. 6) at each station by preselection of certain contacts 42 in the group at any desired station. In other words, every station has an identically alike group of vertically spaced apart contacts 42 which in number and spacing provide selections of spaced apart contacts to be conditioned for action at any one station at a time in a control circuit for completion of the circuit upon engagement therewith by one set of moving contacts at a given row of cells. That is to say, when the moving contacts 41 at the leading edge of a selected row of cells make contact with a preconditioned matching set of station contact blades 42, a control circuit will be completed through a relay switch for actuating the variable-speed gear box 39 to a speed reducing setting for slowing conveyor travel in a final increment of travel and until the next succeeding set of differently spaced moving contacts 41 at the trailing edge of the selected cell wipe another preconditioned set of correspondingly spaced contacts 42 of the same station group, and complete another circuit for actuation of the magnetic clutch and brake in discontinuing drive transmission and braking further movement. With the desired row of cells thus aligned with the station, actuation of the transfer mechanism will enable magazine removal from or return to storage position in the rack.

The magazine transfer mechanism is shown in detail in FIGS. 5 to 8, inclusive. It involves a vertical supporting stanction or post consisting of a pair of spaced apart channel irons 43 presenting vertical trackways 44 to receive guide rollers extending inwardly from opposite sides of a rectangular carriage 45 which carries the oscillatory arm 22 and surrounds or embraces the stationary channel post for movement upwardly and downwardly thereon. For imparting such movement, a reversible electric motor 46 mounted on a top frame bracket and geared to a drive sprocket actuates a sprocket engaging chain 47, one end of which passes around an idler pulley mounted in a top frame bracket 48 and is terminally connected to the carriage 45. Preferably, the oppositely extending chain portion projects downwardly and around idler rollers in a bottom frame bracket 49 and then extends upwardly for terminal connection to the carriage 45.

The stationary post has a series of inwardly extending contact blades 50 which in number and spacing correspond to the number and spaced apart relation of the cells in a vertical row of the movable rack and the blades 50 are for selective co-operation with a contact blade 51 mounted on the moving carriage 45. Any one of the contact blades 50 may be selected at the master station 4 for completing a circuit upon engagement thereby of the carriage supported contact 51 in the course of carriage travel to thereby actuate a relay switch for opening the motor circuit when the travel of the carriage has positioned the carriage at a height for properly effecting transfer of a film magazine between any given cell 30 and the projector receiver 7.

The oscillatable transfer arm 22 previously referred to has one end pivotally mounted on a vertical axis in brackets 52 on the vertically movable carriage 45 and a reversible electric motor 53 is geared to the arm to rock it through an angular path between opposite positions controlled by limit switches 54 (see FIG. 5) associated with the circuit of the motor 53 and operative to position the arm 22 in co-operative relations for the transfer of magazines to and from storage cells and to and from the station projector.

The oscillating arm 22 comprises a pair of relatively slidable portions, the outermost of which is indicated at 55. This outermost portion 55 is a pair of spaced slide rails and can be reciprocated on the pivotally mounted arm 22 for projection and retraction by means of a toothed rack 57 carried by the slide portion 55 and engaged by an actuating pinion 58 driven by one or more reversible electric motors 59 positioned on the arm 22. A pair of motor cut-off switches 59' on the arm 22 define opposite limits of slide rail travel. Near the free end of the reciprocatory arm portion 55, a transverse pivot shaft mounts the intermediate bearings of a pair of scissors-like clamping jaws 60 whose forward ends are normally spring pressed apart and carry a pair of co-operating gripper plates 61 which can be moved together to engage and grip handle formations on film roll magazines 31. At their rear ends the clamping jaws 60 are linked together by a drive motor or solenoid and plunger rod unit 62 which can be energized to close the clamping jaws.

Additionally, one clamping jaw is connected by a link and crank combination 63 to a reversible electric motor 64 mounted at the free end of the reciprocatory sleeve portion 55. The motor 64 normally through its linkage 63 positions the clamping jaws to project outwardly from the free end of the oscillating arm, as shown in FIGS. 6 and 7, whereby the outwardly directed clamping jaws can co-operate with magazine 31 for insertion and removal from the storage cells incident to the reciprocation of the supporting arm portion 55. For depositing and picking up a magazine at the projector receiver 7 and as part of proper oscillation and vertical positioning of the transfer mechanism, the motor 64, through its crank arm linkage 63, can bodily swing the clamping jaws between the previously mentioned outwardly directed position and a vertically downwardly and angularly related position for co-operation with the projector receiver, as seen in FIG. 8.

As described, all operating components of the apparatus are motor driven and the several motors can be individually supplied with electric current by manual actuation of suitable switches incorporated in a switch board at the master station 4. Indicator lights can be included for informing the attendant of the condition of operating components and which of the several viewing stations are in use. For automation purposes, there is contemplated an electric system with interlocking circuits containing suitable relay and timing switches for effecting sequential responses of driving motors according to predetermined patterns to the end that a person requesting inspection of a known frame on a known roll can be directed to one of the viewing booths by the master station attendant, who then through switch board manipulation signals required machine operations for shifting the conveyor to present at a particular booth station that storage bank of cells containing the magazine in which is the roll of microfilm on which is the desired or selected image or picture, whereupon the transfer mechanism selects and removes the roll from its storage position and places the roll in the projector, whereupon the film is unreeled until the named frame is aligned with and its image projected on the viewing screen.

Until inspection is completed at any station, the transfer mechanism at that station remains inactive but the conveyor is available to serve all other stations by presenting any row of cells at any station for either roll removal or return. Return of a roll from any station is effected by switch board control plus conventional memory selector equipment, first to re-align with the station the same rack storage cell from which the roll was removed, accompanied by rereeling of the film tape and actuation of the transfer mechanism to carry the magazine back from the projector and deposit the same in its proper storage cell.

In the first step of delivering a magazine to a given station, the transmission of drive from the conveyor motor 37 is through the clutch and brake unit 38 and associated gearing to the drive sprocket 24 for conveyor rack travel longitudinally in its path traversing all stations. At the same time and in order to stop conveyor travel when the desired storage cell has been brought to the given station, master switches related to the group of contact blades 42 at the given station are closed in two separate control circuits. One of such circuits controls actuation of the motor for the speed reducing unit 39 in the conveyor drive transmission train and includes a selected pair of contact blades 42 whose spaced apart relation coincides with the spaced apart relation of the two contact elements 41 at the lead side of the rack section cell row immediately preceding the row containing the storage cell for the named film magazine. The lead set of contact elements 41 are joined together by a current conductor wire and as they engage momentarily with the preselected set of correspondingly spaced station contact blades 42, they complete the control circuit and cause conveyor speed to be reduced. The other of such control circuits controls the magnetic unit 38 for clutch release and brake application and includes another preselected pair of contact blades 42 in the same station group and whose spaced apart relation coincides with the spaced relation of the two contacts 41 at the trailing side of the mentioned rack cell row. These rack contacts are also joined by a conductor wire and upon their engagement with the selected pair of station blades 42, the magnetic clutch and brake unit 38 acts to stop conveyor travel.

It is to be noted that the several sets of differently vertically spaced apart conveyor contacts 41 are equally spaced apart longitudinally and each set serves as a lead set for one vertical row of cells and also as the trailing set for the next preceding cell row and that the contacts of each conveyor set are for co-operation with correspondingly spaced apart station contacts 42 of all station groups. Furthermore, the contacts 42 of every group can be combined in different sets of two contacts, with the contacts of each set in vertical spacing differing from others, and additionally each set can be placed selectively in either of the two control circuits for initially slowing and finally stopping conveyor travel.

Operation of the components of the magazine transfer mechanism, as illustrated in FIGS. 5-8, is sequential. In an inactive relation, the slide rails 55 of the oscillatory clamp carrying arm are retracted to be outside the path of conveyor travel. To transfer a named magazine from a given cell in a vertical tier aligned with the station, the clamp arm is first aligned vertically with the cell at its height disposition. For that purpose, current is supplied to the reversible motor 46 to raise or lower the carriage 45 until its contact blade 51 engages a stanchion contact blade 50 at given cell height and which contact blade 50 of the group has been preselected and placed in a control circuit for opening the motor circuit upon engagement by the blade 51. Incidentally, the upper and lowermost blades 50 of the vertical group are limit switches to effect travel reversal of the motor 46.

If the arm 22 is radially misaligned in a horizontal plane with the given cell, the oscillation motor 53 is actuated until alignment is established and current is cut off at the properly positioned one of the limit switches 54. Thereafter, energization of the motor 59 projects the slide rails 55 to a forward limit as controlled by one of the limit switches 59' shown in FIG. 5, whereupon current is sent to the solenoid 62 to close the gripper jaws 60 on the adjacent magazine handle. Reversal of the motor 59 retracts the slide rails 55 and removes the magazine from storage, as illustrated in FIG. 7. Thereupon, oscillation through the motor 53 angularly swings the arm 22 toward the projector and coincidently therewith the jaw rotation motor 64 is operated to rock the closed clamp jaws into a downwardly dependent position, as in FIG. 8, while the hoist motor 46 operates to bring the carriage to proper elevation for co-operation of the clamp jaws with the receiver 7 of the projector assembly. Upon oscillatory arm engagement with the other limit switch 54, swing travel is stopped and the carriage is lowered and the clamping jaws are opened to deposit the magazine in the receiver 7. With receipt of the magazine in the receiver, the roll is unwound for viewing of the selected frame, as previously described. The rereeling and transfer arm operating procedure is reversed for returning the magazine to original storage position after the conveyor is first shifted, if necessary, to reposition the magazine storage cell at the station.

In summary, the mechanism for selecting a given one of the many magazines 31 involves in the first instance the drive by the motor 37 of the conveyor for presenting at a desired viewing station the vertical row of storage pockets 30 of which one contains the given magazine. Thereupon, the vertical position of the selector arm 22 is set for horizontal alignment with the given magazine 31; the rails 55 are projected to their outer limit; the clamp jaws 60 are closed and grip the magazine handle; the rails 55 are retracted for removing the magazine; the arm 22 is positioned at a level above the receiver 7; the clamp jaws 60 are oscillated to suspend the magazine vertically downwardly; the arm 22 is oscillated to place the magazine in vertical alignment with the receiver 7 and is lowered to insert the magazine into the receiver; the jaws 60 are opened to release the magazine and coincident with the final insertion of the magazine, the reader turns on automatically and threads the film to the frame wanted.

While only a preferred embodiment of the invention has been described, it will be understood that modifications in the detail arrangement may be made without departing from the scope of the appended claims.

What is claimed is:

1. In combination with a station for a microfilm viewer having a film reel receiver, a movable rack assembly having in longitudinal succession a series of rows of reel storage cells, a supporting trackway for said rack assembly, a motor having drive transmitting connection with the rack assembly to move the same longitudinally on said trackway, control means regulating motor operation and stopping movement of the rack assembly to present any row of cells selectively at the station, a reel selector device constituting a component of the station and embodying holding means releasably attachable to a film reel, means mounting the selector device and accommodating relative movement of the selector device between a reel transfer relation respectively to said receiver and the cells of a row stopped at the station, means to effect such movement to aligned relation of the device with any selected cell in the last mentioned row, other means operating the selector device and its holding means to remove the film reel from cell storage relation and to deposit the reel in said receiver.

2. In combination with a station for a microfilm viewer having a film reel receiver, a movable rack assembly having in longitudinal succession a series of rows of reel storage cells, a supporting trackway for said rack assembly, a motor having drive transmitting connection with the rack assembly to move the same longitudinally on said trackway, control means regulating motor operation and stopping movement of the rack assembly to present any row of cells selectively at the station, a reel selector device constituting a component of the station and embodying holding means releasably attachable to a film reel, means mounting the selector device and accommodating relative movement of the selector device between a reel transfer relation respectively to said receiver and the cells of a row stopped at the station, means to effect such movement to aligned relation of the device with any selected cell in the last mentioned row, other means operating the selector device and its holding means to remove the film reel from cell storage relation and to deposit the reel in said receiver, means to energize said other means to remove a film reel from the receiver and return the reel to its original cell storage relation.

3. In combination with a station for a microfilm viewer having a film reel receiver, a film reel storage rack having a plurality of reel storage cells arranged in a number of rows adjacent one another in side by side succession, means movably mounting the rack for travel to bring a selected row of cells adjacent said station, power means in drive transmitting connection with the rack to effect rack travel, means controlling the operation of said power means to position a given row of cells adjacent said station and reel selector mechanism operative to transfer reels between the cells and said receiver, said selector mechanism constituting a component of the station and comprising a real pickup arm having a reel supporting device operable to attach itself to and to detach itself from a reel, an oscillatory carrier reciprocably mounting said device, an adjustable carriage supporting the carrier to traverse a row of cells and power drive mechanisms operably connected with the several elements respectively to adjust said carriage, to oscillate the carrier, to reciprocate said device and to attach and detach it to and from a reel and control means governing said power drive mechanisms for their operations in sequence.

4. In combination a microfilm viewer, a viewer station, a series of rows of storage cells to contain film reels, a conveyor system supporting the cells for travel in locating a given row in co-operative relation to said station, transfer mechanism operating to transfer reels between the cells and the viewer station and comprising a reel pickup device, an actuator therefor, a reciprocatory slide rail mounting said device for projection and retraction toward and from the row of cells located at the station, an adjustable carriage supporting said rail for travel in traversing relation to such row of cells, a pivot connection between the carriage and said rail accommodating oscillation of the rail in the plane of its reciprocation and a pivot connection between the rail and said pickup device for swinging travel of the pickup device about an axis parallel to said plane.

5. In combination a microfilm viewer, rack means having a series of rows of cells to store film reels, reel transfer means located at the viewer for transfer of reels between the cells and the viewer, drive mechanism connected to one of said means to impart travel thereto relative to the other means for presenting a given row of cells adjacent the viewer, reel pickup means constituting a part of the transfer means, mechanism connected with and operable to impart travel to one of said pickup means and said rack means for their relative movement in presenting the pickup means in co-operative relation with a given cell of said given row and actuator mechanism for the pickup means operable to cause the same to hold and effect transfer of a reel.

6. In combination, a series of stations each having a microfilm viewer, a series of transfer devices located one at each station and operable to transfer film magazines between the station viewer and a succession of storage cells and a storage cell conveyor comprising an endless trackway traversing the locations of and for presenting storage cells in co-operative relation to said transfer device, a number of rack members each having a vertical succession of storage cells and being positioned in side by side succession along the trackway, power mounting projections carried by each rack member at both sides thereof in aligned mating relation to mounting projections of adjacent members, supporting hinge rods fitted in the aligned mounting projections and provided with guides in tracking engagement with said trackway, a motor having drive transmitting connection with the rack members, a set of spaced apart circuit contacts carried at each rack member with those of each set spaced differently from those of all other sets and a group of spaced apart circuit contacts at each station arranged in spaced combination with one another and in relationships to provide different sets of spaced apart contacts matching contact spacing of the respective sets of rack member carried contacts and adapted for selective contact co-operation to thereby regulate motor operation so as to present any given rack member in operative relation to the transfer device of any station.

7. The structure of claim 6 wherein there are two sets of circuit contacts in tandem succession at each rack member for co-operation successively during cell conveyor travel one with a selected set of contacts in a group at any station and the other with another selected set of contacts in said group and wherein the motor drive transmitting connection includes a variable-speed gear responsive to the closing action of the first mentioned set of contacts for slowing conveyor travel and also includes a magnetic clutch and brake responsive to the closing action of the second set of contacts for stopping conveyor travel.

8. For the transfer of microfilm magazines between a viewer and a vertical succession of magazine storage cells, a vertical trackway, a carriage tracking on the trackway, carriage drive means operable to position the carriage at vertically spaced apart zones respectively, an oscillatory arm pivotally mounted on the carriage for swinging in a horizontal plane between angularly spaced transfer positions, a drive motor operably connected with the arm for swinging the same, a retractable-projectable extension slidably mounted on the oscillatory arm, motion transmitting means between the arm and said extension controlling the projection and retraction of the extension, a pair of magazine clamping jaws pivotally mounted at the free end of said extension and motor means connected with and operable to open and close the clamping jaws.

9. The transfer mechanism of claim 8 together with a motor mounted on said extension and jaw-connected linkage controlled by the motor to shift the jaws as a unit about their pivot mounting and between angularly related limits at one of which the jaws extend in a direction outwardly of said extension for action at one of said transfer positions and at the other of which the jaws extend in a different direction for their action at the other of said transfer positions.

10. In a high-speed finder of specific frames on a microfilm viewer and for use with a film tape having a succession of spaced apart opaque markers occupying tape length fragments adjacent each frame, a projector having a traveling tape feeder, an electric motor drive-connected with the feeder, a light source to project light across the tape travel path, a photocell mounted to receive light from said source except in intervals when light is blanked by opaque markers and an adjustable counter controlling cessation of feeder motor operation and having connection with said photocell for response to light blanking intervals of a number to which the counter has been preset.

11. A record filing and finding system including a series of stations each containing a microfilm viewer having a film magazine receiver, an endless conveyor having a travel circuit traversing said stations and comprising a succession of vertically tiered magazine storing cells, power operated means to effect travel of the conveyor, mechanism controlling the application of power to said means and for bringing any tier of cells into operating relation with any station selectively, magazine transfer mechanism at each station operative to transfer a magazine between the viewer receiver and any selected cell of a vertical tier positioned at the station and a central control station having control devices selectively operable to effect operation of the power applying mechanism and of the magazine transfer mechanism.

12. A filling and finding system for microfilm records including movable rack means having a succession of tiers of film magazine storage cells, a trackway supporting and guiding the path of movement of the rack means, a viewing station positioned adjacent the path of rack movement and provided with a magazine receiver, power drive mechanism operable to move the rack means on said trackway and to position the successive tiers of cells selectively in co-operative relation with the station, magazine transfer means at the station operable to transfer magazines between the receiver and the storage cells, power drive mechanism having drive transmitting connection with one of said means to move the same relative to the other of said means in a direction normal to the aforesaid path of movement of the rack means and to establish a transfer relation between the transfer means and the cells respectively of a tier positioned at the station.

13. In a filing and frame finding system for microfilm records, a rack having a succession of film magazine storage cells, a projector station adjacent the rack having a magazine receiver and means to transfer magazines between the receiver and the storage cells including a traveling carriage having a path of movement traversing said succession of cells, an oscillatory arm pivotally mounted on the carriage for swinging movement between positions co-operable with the receiver and the storage cells, a magazine supporting device mounted on said arm for movement therewith and separably operable to effect magazine holding and releasing actions and power transmitting connections with the carriage, the arm and the supporting device for their sequential operation in predetermined patterns selectively.

14. In a filing and frame finding system for microfilm records, a succession of hinged together rack sections each containing a tier of magazine storage cells, an endless trackway supporting and guiding the rack sections for travel in a circuit, a frame viewing station adjacent the travel path of the rack sections and having a magazine receiver, controlled power drive mechanism operable to impart movement to the rack sections in positioning any section selectively at said station and selectively controlled transfer means operable to transfer magazines between storage cells and the receiver including a magazine pickup device, a movable arm supporting said pickup device for travel between spaced apart positions adjacent the receiver and the storage cells and means for moving said arm in a direction to present the pickup device in co-operative relation to said storage cells selectively.

References Cited by the Examiner
UNITED STATES PATENTS

| | | | |
|---|---|---|---|
| 2,209,342 | 7/40 | Loughridge | 88—24 |
| 2,497,219 | 2/50 | Haumann | 221—81 |
| 2,875,877 | 3/59 | Hoban | 221—85 |
| 2,941,738 | 6/60 | Burke | 214—16.42 X |
| 3,002,434 | 10/61 | Reuter | 88—24 |

NORTON ANSHER, *Primary Examiner.*

EMIL G. ANDERSON, G. Y. CUSTER, *Examiners.*